United States Patent [19]

Kramer

[11] Patent Number: 4,621,862
[45] Date of Patent: Nov. 11, 1986

[54] CLOSING MEANS FOR TRUCKS

[75] Inventor: Thomas Kramer, Krefeld, Fed. Rep. of Germany

[73] Assignee: The Coca-Cola Company, Atlanta, Ga.

[21] Appl. No.: 663,245

[22] Filed: Oct. 22, 1984

[51] Int. Cl.⁴ .............................................. B60J 5/06
[52] U.S. Cl. ................................ 296/183; 160/84 R; 52/2
[58] Field of Search ................. 296/50, 181, 183, 146, 296/155, 24 A; 160/84 R, 121 R, 121 C, 41, 11; 52/2

[56] References Cited

U.S. PATENT DOCUMENTS

| | | | |
|---|---|---|---|
| 3,231,006 | 1/1966 | Fisher et al. | 160/41 |
| 3,709,552 | 1/1973 | Broadbent | 296/183 |
| 4,408,793 | 10/1983 | Broadbent | 296/181 |
| 4,422,492 | 12/1983 | Bledsoe | 160/84 R |
| 4,444,238 | 4/1984 | Adler | 160/84 R |

FOREIGN PATENT DOCUMENTS 1509265  5/1969  Fed. Rep. of Germany .... 160/84 R

Primary Examiner—Robert B. Reeves
Assistant Examiner—Carol L. Olson
Attorney, Agent, or Firm—Eduardo M. Carreras

[57] ABSTRACT

To close the opening (15) of the load compartment (14) of a truck, one end of a tarpaulin (20) is fixed above the opening (15), while its other end comprises a hooking means (24) that can be firmly hooked in the lower end of the opening (15). The tarpaulin (20) is provided with holes (25) through which the traction elements (18) are threaded. The latter are wound on tension rollers (17) contracting the tarpaulin (20) to form a parcel. To close the opening (15), the hooking means (24) is hooked to catch the lower end of the opening (15). By inflating a cushion (23) over which the tarpaulin (20) is guided, it will be stretched accordingly.

4 Claims, 6 Drawing Figures

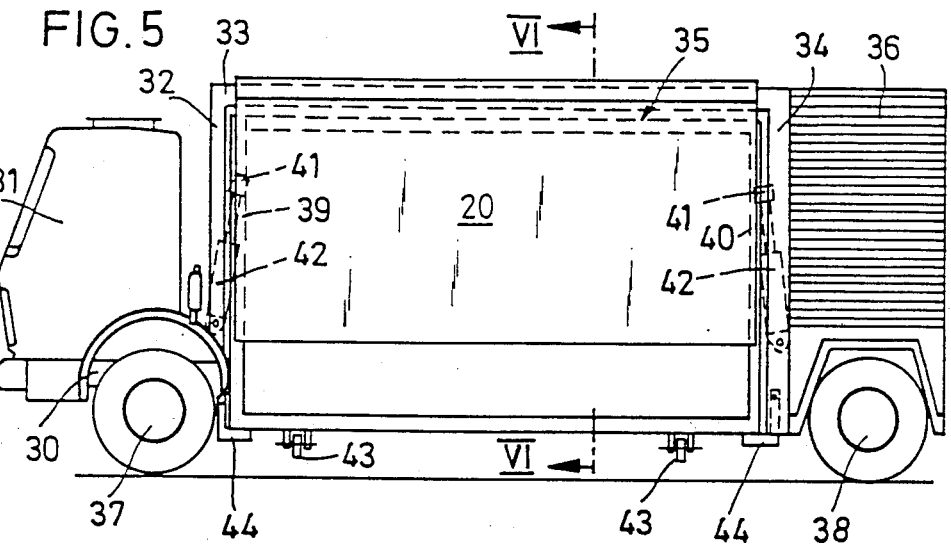
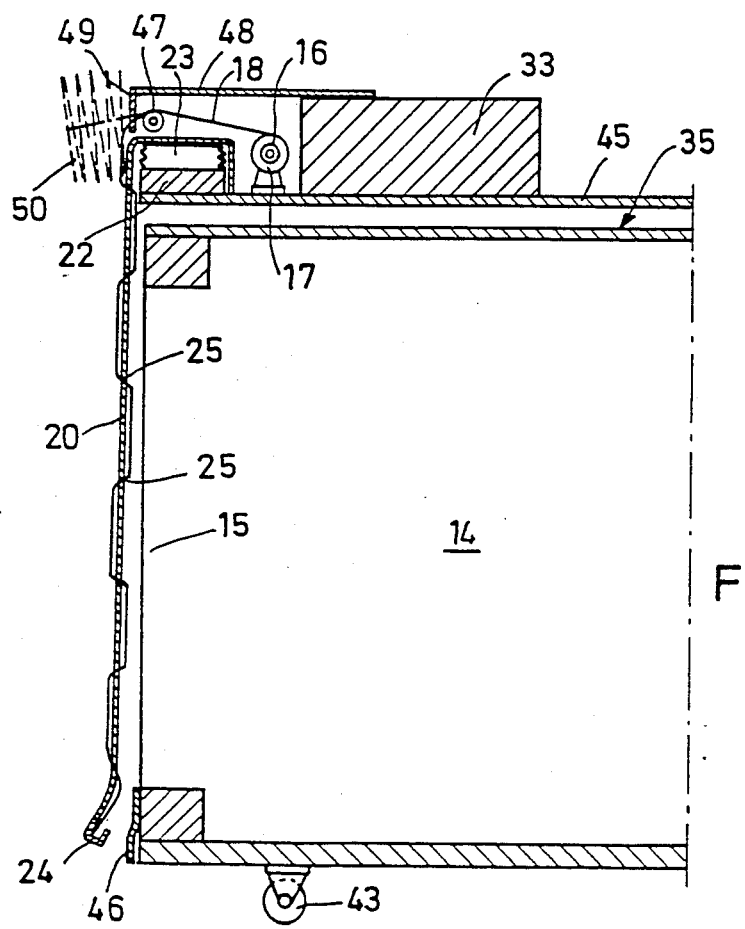

CLOSING MEANS FOR TRUCKS

The invention relates to a closing means for trucks for closing an opening of the load compartment, comprising a tarpaulin secured to an upper support element and having vertical rows of holes through which traction elements are threaded.

It has been known to use a tarpaulin for closing the load compartment of trucks. According to some known solutions, it has been also possible to use the tarpaulin for protecting the loads in that they are reinforced horizontally or vertically by belts and stretched in the direction of the reinforcing belt extension by means of suitable devices. However, the operation of the existing tensioning devices is very often quite complicated and involved, and opening as well as closing of the tarpaulins is time consuming, indeed, because they are of the throwing type and must be opened in horizontal direction. Even in released condition, such tarpaulins do not cover the full loading surface, but they have to be displaced additionally, as the case may be.

It is the object of the invention to provide a closing means of the foregoing type which allows to remove in a simple manner the tarpaulin from the opening and which permits to simply close without any problems said opening.

To solve said problem, it is provided according to the invention that the upper ends of the traction elements are fixed at tension rollers and that the lower ends of the latter are connected firmly to the lower ends of the tarpaulin thus folding it together like an accordion and drawing it against a stop when the traction elements are wound on the tension rollers.

Although they have the same position direction, the functions "opening," "closing" and "tensioning" are separate mechanical operations. This is realized in that the tarpaulin is firmly clamped at an upper support element of the vehicle or of the loading surface resp., while, on the other hand, suitable traction elements are conducted vertically like a serpentine through a row of eyes extending vertically in the tarpaulin. Said traction elements are fastened at the lower tarpaulin end, on the one hand, and in the upper region of the vehicle or loading surface, they are guided on a rotating shaft permitting it to wind on and off synchroneously the traction elements. Due to the guided traction elements in connection with horizontally extending reinforcing elements in the tarpaulin, e.g. in the form of rods fixed by sewing, it is possible to fold together the tarpaulin in a defined manner and accordionwise in upward direction against a stop.

According to the closing means of the invention, the traction elements are drawn off the tension rollers for closing the opening, thus unfolding the tarpaulin from a previously formed accordion-like parcel to stretch it before the opening. The lower end of the tarpaulin may be hooked in the lower end of the opening, so that the opening may be easily closed by only drawing the lower end of the tarpaulin. If the opening is cleared, the lower end of the tarpaulin will be unhooked and the tarpaulin is folded together by winding the traction elements on the tension rollers. As a result, the tarpaulin forms a parcel like an accordion which adjoins the abutment provided at the upper end of the opening.

In other words, the tarpaulin need not be rolled up or slipped over the vehicle roof, but due to the tensioned traction elements, a defined folding is ensured.

Thus, the opening of the loading surface is cleared off automatically, the tarpaulin being removed from the opening area to form a defined parcel that does not obstruct at all the access to the opening.

Preferably, a respective horizontal reinforcing element is provided between two holes of a row of holes and secured to the tarpaulin. Said reinforcing elements facilitate the defined folding of the tarpaulin to form a parcel. At the same time, they protect the load by reinforcing the tarpaulin in transverse direction. The reinforcing elements may be made of rods or bars of metal, wood, plastics or the like.

The tension rollers may be mounted on a common shaft prestressed by at least one torsion spring. As a result, all of the traction elements of one tarpaulin are prestressed sychroneously and with the same force, the uniform hauling of the tarpaulin over its total width being warranted accordingly.

According to a preferred embodiment of the invention, a hooking means at the lower end of the tarpaulin serves for catching hold at the lower edge of the opening, the tarpaulin firmly clamped at one end being deviated over an inflateable cushion, and its length dimension being such that, with a non-inflated cushion, the hooking means can be secured to the lower end of the opening, when the tarpaulin is completely unfolded. The latter will be stretched if the cushion is subsequently inflated.

As an essential advantage of this measure, it is easily possible to stretch the tarpaulin by only inflating the cushion. While the tarpaulin is hooked at the lower end, it is stretched at the upper end. The mentioned principle of mechanically separating the functions "closing" and "stretching" is important because the fixing means to be provided at the lower end of the opening must not include any tensioning devices, but only hooking elements. The cushion may be connected to the compressed air unit of the vehicle which is also used to actuate the brakes, it being possible to control the air supply into the cushion and air deflation out of the cushion by a manually operable valve.

The cushion may be also mounted beneath the aperture so that the tarpaulin is stretched from below while the upper end is firmly clamped. Preferably, the cushion is fixed at the upper support element near the clamping point of the tarpaulin.

According to a preferred embodiment of the invention, the loading surface forms part of an interchangeable load carrier at which hooking means can be anchored and the support element, the tension rollers and the inflateable cushion are provided at a bridge of the truck, which bridge overengages the load carrier. This refers to kind of a container vehicle, in which the load carrier is not a container of the usual type with closed side walls, but its side walls are open. The tarpaulin and its fixing and tensioning means are secured to the bridge of the truck. The lower end of the tarpaulin will be hooked in the load carrier. By this means, the load carrier may be laterally covered and closed with the aid of the tarpaulin forming part of the truck.

Embodiments of the invention will be explained hereunder with reference to the drawings:

FIG. 5 is a side view of a vehicle with interchangeable load carrier and FIG. 6 is a part-section along line VI—VI of FIG. 5.

Figure 1:
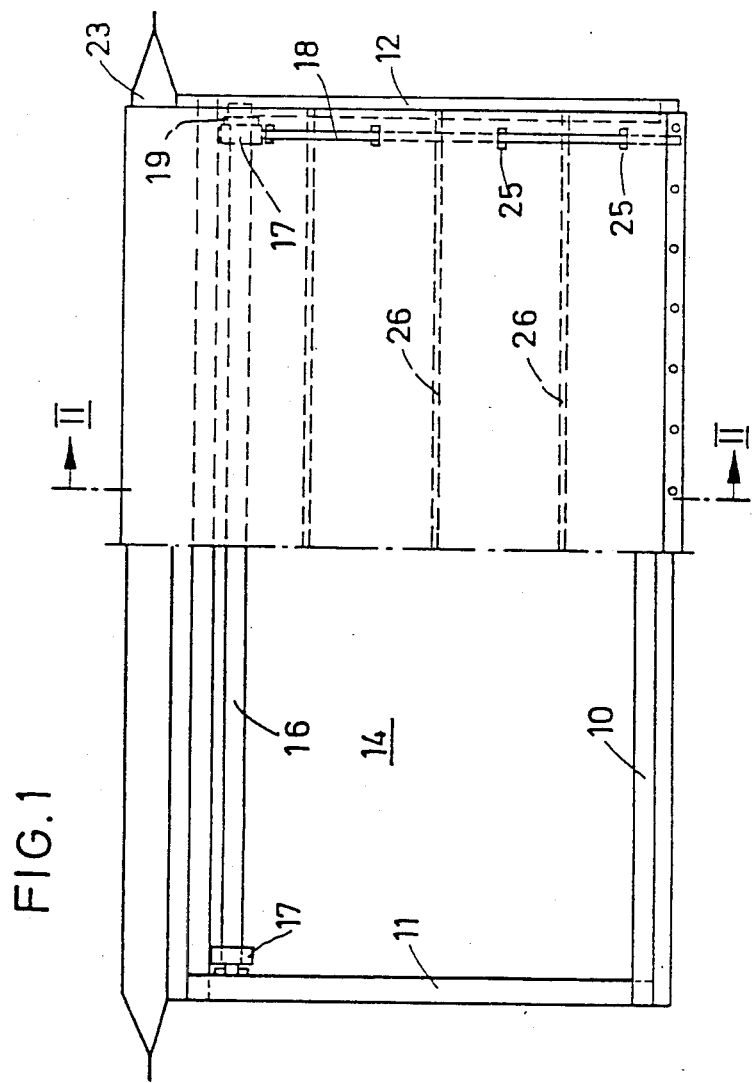
FIG. 1 is a view of the closing device at a truck.

FIG. 1 shows a side view of the load receiving portion of a truck having a loading floor formed by a bottom wall 10 from which extends upwardly a vertical front wall 11 facing the (non-illustrated) driver's cabin. The closed rear wall 12 at the rear end of the vehicle extends in parallel to the front wall. The top side of the load compartment 14 is limited by a horizontal ceiling wall 13, while the sides of the load compartment 14 are open.

At each lateral opening 15 of the load compartment 14 beneath the ceiling wall 13, there is provided a horizontal shaft the ends of which are supported in the front wall 11 and in the rear wall 12, said shaft 16 carrying tension rollers 17 on which traction elements 18 may be wound, the traction elements 18 of the instant embodiment being belts which are wound spirally on the tension rollers 17. The shaft 16 is tensioned by a stationarily supported torsion spring 19 imparting to the tension rollers 17 the tendency of winding on the traction elements 18.

The upper end of tarpaulin 20 is fixed with an attachment strip 21 on a plate-shaped carrier element 22 which is secured to the ceiling wall 13. At the same time, said attachment strip 21 is used to secure the cushion on the carrier element 22. Said cushion 23 is a hose extending all over the width of tarpaulin 20 and provided above the lateral edge of the ceiling wall 13. The tarpaulin 20 extends beyond the cushion 23 and is deviated by the cushion 23 and between the attachment strip 21 and the opening 15. In the condition shown in FIG. 2, the tarpaulin 20 extends vertically in downward direction ahead of the opening 15. At the lower end of the tarpaulin 20 a hook of hooking means 24 engages a strip 25 provided at the underside of the bottom wall 10 near the opening 15. If the cushion 23 is relieved (so as to be flat), the hooking means inflated with air, the tarpaulin 20 is tightened over its total length, the cushion 23 tending to press it upwardly while the tarpaulin simultaneously retained at its lower end by the hooking means 24.

Each of the traction elements is threaded through holes 25 of a row of holes in the tarpaulin 30. As evident from FIG. 1 (right-hand) and from FIG. 2, a traction element 18 extends in one area between two holes 25 along the outside of the tarpaulin, and in the next area, it is situated between two holes 25 along the inside of the tarpaulin 20 etc. In the center of an area between two holes 25, the tarpaulin 20 is strengthened by a reinforcing element 26, said reinforcing elements being rods fastened by sewing in the plane or secured otherwise at it. They extend in parallel to the hooking means 24 or to the shaft 16 resp.

Figure 2:
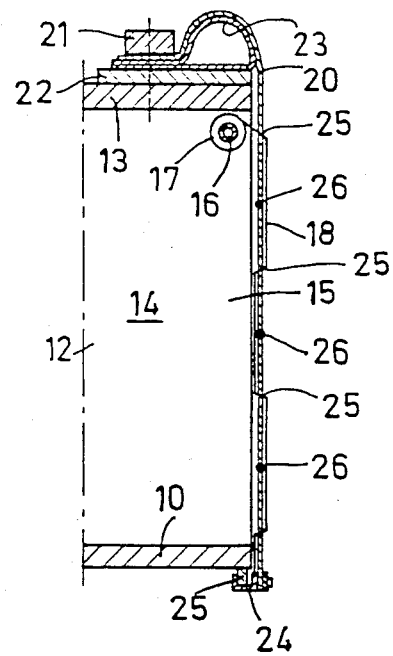
FIG. 2 is a section along line II—II of FIG. 1, with the tarpaulin extended down.
Figure 3:
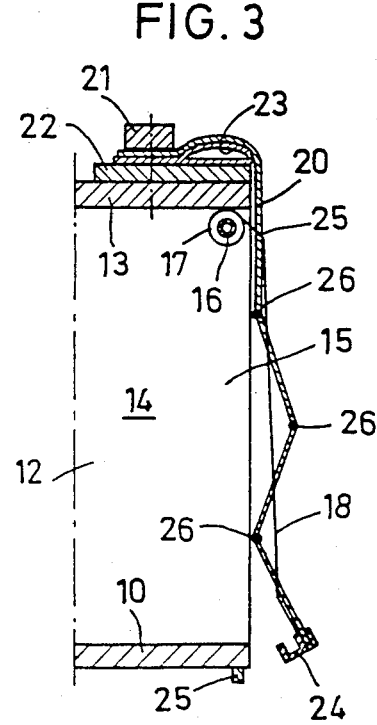
FIG. 3 is a view like FIG. 2, when the tarpaulin is being opened.

If it is intended to terminate the closing condition such as illustrated in FIG. 2, the cushion 23 is deflated, the tarpaulin 20 not being tensioned any longer accordingly so that the hooking means 24 may be disconnected from the strip 25. At that moment, the traction elements 18 are wound up by the tension rollers 17 such as shown in the initial phase in FIG. 3, illustrating clearly that the individual sections between the reinforcing elements 26 are folded accordionwise, the reinforcing elements 26 situated inside relative to the traction elements 18 forming the inner kink points while the reinforcing elements 26 situated outside in regard to the traction elements 18 are forming the outer kink points.

Figure 4:
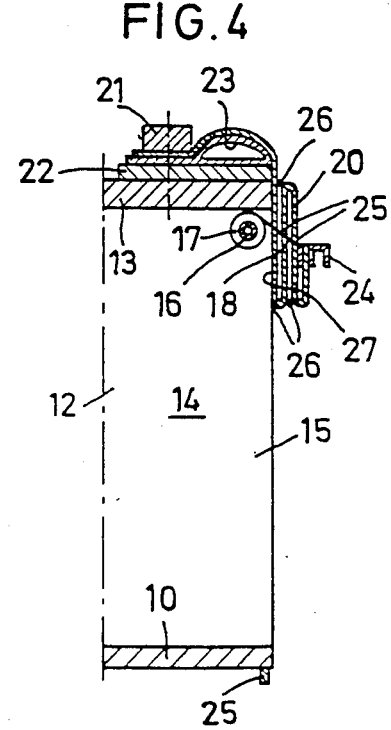
FIG. 4 is a view like FIG. 2 with a tarpaulin opened completely.

FIG. 4 shows the configuration taken by the tarpaulin 20 with the maximum winding of the traction elements 18 on the tension rollers 17. The holes 25 through which the traction elements 18 are threaded, are nearly superimposed in the formed accordion-like parcel of the plan 20, so that the traction elements 18 may straightly extend through the holes 25. The outer end of the parcel is formed by the hooking means 24 to which the ends of the traction elements 18 are secured. Said traction elements 18 are provided substantially straightly in each phase within the reach of the opening 15 because they are under the tension of the tensioning means 19. If the tarpaulin is folded together according to FIG. 4, the reinforcing elements 26 marketing the kink points of the tarpaulin 20 are at the outsides of the parcel which adjoins from the outside a stop 27 near the shaft 16. Accordingly, if the lower end of the tarpaulin is disengaged, the tarpaulin is folded together in the manner shown in FIG. 4 to rest against the upper end of the border of opening 15. For closing the opening 15, the hooking means 24 only need be drawn downwardly to be hooked in the strip 25. If air is subsequently inflated in the cushion 23, the tarpaulin 20 is stretched between the upper attachment strip 21 and the lower hooking means 24, thus preventing the tarpaulin from fluttering and enabling it to protect the load against its drop out of the opening 15.

FIGS. 5 and 6 show a truck lending itself very well to the transfer of beverages. The truck is provided with a frame 30 at which the driver's cabin is mounted. Behind said cabin 31, and adjacent to the frame 30, there is a vertical support 32 communicating with the rear vertical support 34 via horizontal supports 33. Supports 32, 34 and 33 form an inverted U-shaped structure open to the bottom and overengaging the total length of the load carrier 35—viewed from the side of the truck. At the rear side of the rear vertical support 34, the motor 36 driving the rear wheels is mounted. Not only the front axle 37 but also the rear axle is suspended at the frame 30 via spring and damping elements. The load carrier 35 has a rectangular box profile open to the sides, while the other four walls (bottom, ceiling, front and rear walls) are of the closed design. The outsides of the front wall 39 and the rear wall 40 of the load carrier 35 are provided with projections 41 which may be engaged by an element 42 being supported at the frame 30. The lifting elements 42 are piston-cylinder units which are hinged between the two front supports 32 and between the two rear supports 34. The lifting elements 42 extending substantially vertically engage the projections 41 to lift the load carrier 35 from the floor where it may be situated on rolls 43. In travel position as illustrated in FIG. 5, the locking elements 44 of the frame 30 engage the load carrier 35 to connect it rigidly to the rigid frame 10.

As depicted in FIG. 6, the shaft 16 with the tension rollers 17 is supported by the upper wall 45 being mounted beneath the supports 33. Moreover, a strip-shaped support element 22 fixed on the upper wall 45 carries the inflatable cushion 23.

The tarpaulin 20, fixed at the inwardly directed side of the support element 22 extends over the cushion 23 and along the lateral opening 15 of the load carrier 35 in downward direction. At the lower end of the tarpaulin 20, there is the hooking means 24 which can be applied under an external projection of the flap 46 at the lower end of the opening 15 of the load carrier 35 to be hooked at that flap 46. Just as shown in the first embodiment, the traction elements 18 are threaded through the holes 25 of the tarpaulin 20. Above the cushion 23, deviating rollers 47 ensure that the traction elements 18 are guided vertically in spaced relationship over the cushion 23 to the tension rollers 17. Form the deviating rollers 47 extends a covering panel 48 secured to the corresponding support 33 and having at its outside a downwardly deflected leg 49 which forms an abutment for the parcel 50 resulting from the folded tarpaulin, that extends through a slot beneath the leg 49. As obvious from FIG. 6, the parcel 50 formed by the folded tarpaulin 20 is above the load carrier 35 thus not interfering with the interchange of the latter. The tarpaulin 15 and the traction elements 18 as well as all other elements of the closing means—except for flap 46—form part of the vehicle while the flap 46 is mounted at the interchangeable load carrier 35 the opening 15 of which shall be closed.

To fold together the plane 20 in the vicinity of the upper end of the opening 15, use can be also made of more than two traction elements 18, by providing one or more traction elements in the central region of the opening 15. What is important is that the traction elements 18 are wound up like a snap-type blind to fold the tarpaulin 20 in the shown manner so that a parcel 50 is formed in which all of the traction elements 18 extend nearly straightly through the superimposed holes 25 of each row of holes.

To maintain the tightened condition of the tarpaulin 20 being stretched, a tension is not only applied by the traction elements 18, but also by the cushion 23.

As apparent from FIGS. 1 and 5, reinforcing belts 51 are fitted at the inside of the tarpaulin 20, e.g. by sewing. Said vertical reinforcing belts 51 which are fixed at the hooking means 24 and which are stretched upon inflation of the cushion 23 are particularly meant for safeguarding against displacement the load to be shipped inside the loading compartment 14 in that it will be prevented from dropping out of it.

What is claimed is:

1. Closing means for a truck having a load compartment with at least two vertical members a horizontal ceiling member and a horizontal floor member defining an opening comprising:

a tarpaulin secured along a substantial portion of its upper end to the horizontal ceiling member;

means disposed along substantially the entire length of the lower end of said tarpaulin for securing the lower end of said tarpaulin to the horizontal floor member;

means coupled to the tarpaulin for upwardly folding the tarpaulin; and an inflatable cushion disposed between the ceiling member and the tarpaulin; and means for inflating the cushion when the tarpaulin is secured to the horizontal floor member, whereby the tarpaulin is placed under tension in the vertical direction.

2. The closing means of claim 1 wherein said means for folding comprises:

a horizontally disposed shaft attached to the load compartment;

at least two rollers disposed on said shaft;

means for imparting a predetermined torque to said shaft; and traction elements attached to said rollers and threaded through holes in said tarpaulin, the lower ends of the traction elements being firmly connected to the lower end of the tarpaulin.

3. The closing means of claim 1 wherein said means for securing comprises:

a hooking means disposed along substantially the entire lower end of the tarpaulin; and means attached to the horizontal floor member for engaging said hooking means whereby the tarpaulin can be secured along substantially its entire length to the horizontal floor member and uniformly tensioned in a vertical direction.

4. The closing means of claim 1 further comprising:

a plurality of reinforcing elements disposed horizontally and attached to said tarpaulin.

* * * * *